(12) United States Patent
Seo et al.

(10) Patent No.: US 11,947,316 B2
(45) Date of Patent: Apr. 2, 2024

(54) MULTI-IMAGE DISPLAY APPARATUS PROVIDING HOLOGRAPHIC IMAGE

(71) Applicant: SAMSUNG ELECTRONICS CO., LTD., Gyeonggi-do (KR)

(72) Inventors: Wontaek Seo, Yongin-si (KR); Youngil Kim, Seongnam-si (KR); Byeongsoo Son, Seongnam-si (KR); Changkun Lee, Seoul (KR); Gyewon Seo, Seongnam-si (KR); Geeyoung Sung, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/900,650

(22) Filed: Aug. 31, 2022

(65) Prior Publication Data

US 2022/0413436 A1    Dec. 29, 2022

Related U.S. Application Data

(62) Division of application No. 16/670,261, filed on Oct. 31, 2019, now Pat. No. 11,467,535.

(30) Foreign Application Priority Data

May 8, 2019 (KR) .................. 10-2019-0053889
Jul. 11, 2019 (KR) .................. 10-2019-0083944

(51) Int. Cl.
*G03H 1/22* (2006.01)
*G02B 27/01* (2006.01)
(Continued)

(52) U.S. Cl.
CPC ....... *G03H 1/2294* (2013.01); *G02B 27/0101* (2013.01); *G02B 27/285* (2013.01);
(Continued)

(58) Field of Classification Search
CPC .......................... G02B 27/283; G02B 27/285; G02B 27/0101; G02B 27/0103; G03H 1/12;
(Continued)

(56) References Cited

U.S. PATENT DOCUMENTS 7,675,684 B1   3/2010   Weissman et al.
8,786,686 B1   7/2014   Amirparviz
(Continued)

FOREIGN PATENT DOCUMENTS

KR   10-1999-0081519 A   11/1999
KR   10-2013-0139280 A   12/2013
KR   10-2018-0012057 A   2/2018

OTHER PUBLICATIONS

Cheng, Dewen et al., "Design of an optical see-through head-mounted display with a low f-number and large field of view using a freeform prism", Applied Optics, vol. 48, No. 14, May 10, 2009, pp. 2655-2668. (14 pages total).
(Continued)

*Primary Examiner* — Derek S. Chapel
(74) *Attorney, Agent, or Firm* — Sughrue Mion, PLLC

(57) ABSTRACT

Provided is a multi-image display apparatus including a light source configured to emit light, a spatial light modulator configured to provide a first image by modulating the light emitted from the light source, and an optical system configured to transmit the first image provided by the spatial light modulator to a viewer, wherein the optical system is configured such that a travelling path of the first image provided by the spatial light modulator includes a first optical path in a first direction, a second optical path in a second direction orthogonal to the first direction, and a third optical path in a third direction orthogonal to the first direction and the second direction, respectively, and wherein the optical system is configured such that the first image and
(Continued)

a second image provided from an optical path different from the travelling path of the first image are provided to the viewer.

4 Claims, 21 Drawing Sheets

(51) Int. Cl.
*G02B 27/28* (2006.01)
*G03H 1/02* (2006.01)
*G03H 1/12* (2006.01)
*G03H 1/28* (2006.01)

(52) U.S. Cl.
CPC ............. *G03H 1/12* (2013.01); *G03H 1/2205* (2013.01); *G03H 1/28* (2013.01); *G02B 27/0103* (2013.01); *G03H 2001/0224* (2013.01); *G03H 2001/221* (2013.01)

(58) Field of Classification Search
CPC ...... G03H 1/2294; G03H 1/2205; G03H 1/28; G03H 2001/0224; G03H 2001/2284; G03H 2001/221; G03H 2223/20; G03H 2223/24
USPC ............................................ 359/13, 630–633
See application file for complete search history.

(56) References Cited

U.S. PATENT DOCUMENTS

| | | | |
|---|---|---|---|
| 9,430,055 B2 | 8/2016 | Westerinen et al. | |
| 9,588,341 B2 | 3/2017 | Bar-Zeev et al. | |
| 10,334,236 B2 | 6/2019 | Sung et al. | |
| 11,442,277 B2 * | 9/2022 | Seo | G02B 26/101 |
| 2017/0185037 A1 | 6/2017 | Lee et al. | |
| 2019/0324271 A1 | 10/2019 | Lee et al. | |
| 2022/0082831 A1 | 3/2022 | Seo et al. | |

OTHER PUBLICATIONS

Gao, Qiankun et al., "Compact see-through 3D head-mounted display based on wavefront modulation with holographic grating filter", Optics Express, vol. 25, No. 7, Apr. 3, 2017, pp. 8412-8424. (13 pages total).

Maimone, Andrew et al., "Holographic Near-Eye Displays for Virtual and Augmented Reality", ACM Transactions on Graphics, vol. 36, No. 4, Article 85, Jul. 2017, pp. 85:1-85:16. (16 pages total).

Moon, Eunkyong et al., "Holographic head-mounted display with RGB light emitting diode light source", Optics Express, vol. 22, No. 6, Mar. 24, 2014, pp. 6526-6534. (9 pages total).

Murakami, Eishin et al., "Study on Compact Head-Mounted Display System Using Electro-Holography for Augmented Reality", IEICE Transactions on Electronics, vol. E100-C, No. 11, Nov. 2017, pp. 965-971. (8 pages total).

Pan, Jui-Wen et al., "Demonstration of a broad band spectral headmounted display with freeform mirrors", Optics Express, vol. 22, No. 11, Jun. 2, 2014, pp. 12785-12798. (14 pages total).

Park, Jae-Hyeung et al., "Optical see-through holographic near-eye-display with eyebox steering and depth of field control", Optics Express, vol. 26, No. 21, Oct. 15, 2018, pp. 27076-27088. (13 pages total).

Wei, Lidong et al., "Design and fabrication of a compact off-axis see-through head-mounted display using a freeform surface", Optics Express, vol. 26, No. 7, Apr. 2, 2018, pp. 8550-8565. (16 pages total).

Yeom, Han-Ju et al., "3D holographic head mounted display using holographic optical elements with astigmatism aberration compensation", Optics Express, vol. 23, No. 25, Dec. 14, 2015, pp. 32025-32034. (10 pages total).

Zhang, Zhiqi et al., "A full-color compact 3D see-through near-eye display system based on complex amplitude modulation", Optics Express, vol. 27, No. 5, Mar. 4, 2019, pp. 7023-7035. (13 pages total).

Communication dated Jan. 22, 2024 by the Korean Intellectual Property Office in Korean Application No. 10-2019-0083944.

* cited by examiner

MULTI-IMAGE DISPLAY APPARATUS PROVIDING HOLOGRAPHIC IMAGE

CROSS-REFERENCE TO RELATED APPLICATIONS

This application is a divisional application of U.S. application Ser. No. 16/670,261, filed Oct. 31, 2019, which claims the priority from Korean Patent Application No. 10-2019-0053889, filed on May 8, 2019, and Korean Patent Application No. 10-2019-0083944, filed on Jul. 11, 2019, in the Korean Intellectual Property Office, the disclosures of which are incorporated herein in their entireties by reference.

BACKGROUND

1. Field

Example embodiments of the present disclosure relate to multi-image display apparatuses, for example, an augmented reality (AR) system, and more particularly, to multi-image display apparatuses capable of providing a holographic image.

2. Description of the Related Art

Along with the recent development of electronic devices and display apparatuses capable of implementing virtual reality (VR), interest in VR is also increasing. Techniques capable of implementing augmented reality (AR) and mixed reality (MR) as the next stage of VR have been studied.

AR, unlike VR assuming a complete virtual world, is a display technology for showing a virtual object or information in an overlapping (or combined) manner in a real-world environment, further enhancing the effect of reality. While VR is only applicable to the field of games or virtual experiences, AR is applicable to various real environments. In particular, AR draws the attention as a next generation display technology suitable for a ubiquitous environment or an internet of things (IoT) environment. Such AR may be an example of MR in that it shows the real world and additional information such as the virtual world in a mixed manner.

SUMMARY

One or more example embodiments provide multi-image display apparatuses, for example, an augmented reality (AR) system, and more particularly, to multi-image display apparatuses capable of providing a holographic image.

According to an aspect of an example embodiment, there is provided a multi-image display apparatus including a light source configured to emit light, a spatial light modulator configured to provide a first image by modulating the light emitted from the light source, and an optical system configured to transmit the first image provided by the spatial light modulator to a viewer, wherein the optical system is configured such that a first travelling path of the first image provided by the spatial light modulator includes a first optical path in a first direction, a second optical path in a second direction orthogonal to the first direction, and a third optical path in a third direction orthogonal to the first direction and the second direction, and wherein the optical system is configured such that the first image and a second image provided from a second travelling path that is different from the first travelling path are provided to the viewer along the third optical path.

The first image may be a virtual holographic image and the second image may be an external image including an actual external scene.

The spatial light modulator may include a reflective spatial light modulator configured to reflect and modulate the light emitted from the light source.

The optical system may include a first beam splitter configured to reflect the light emitted from the light source to the spatial light modulator and transmit the light reflected from the spatial light modulator, a second beam splitter configured to transmit the light from the first beam splitter, a first mirror configured to reflect the light transmitted through the second beam splitter towards the second beam splitter, a third beam splitter provided in the second direction from the second beam splitter, and a second mirror configured to reflect light from the third beam splitter towards the third beam splitter.

The second beam splitter may be configured to reflect the light reflected from the first mirror towards the third beam splitter.

Each of the first beam splitter, the second beam splitter, and the third beam splitter may include a semi-transmissive mirror configured to reflect half of the incident light and transmit the other half of the incident light.

Each of the first beam splitter, the second beam splitter, and the third beam splitter may include a polarization beam splitter configured to reflect light having a first linearly polarized light component and transmit light having a second linearly polarized light component that is orthogonal to the first linearly polarized light component.

The optical system may further include a first quarter-wave plate provided between the second beam splitter and the first mirror, and a second quarter-wave plate provided between the third beam splitter and the second mirror.

The third beam splitter may be configured to reflect the light from the second beam splitter and transmit the light reflected from the second mirror.

The second mirror may include a first surface facing the third beam splitter and a second surface opposite to the first surface, and the second mirror may be configured to reflect a first image incident on the first surface and to transmit a second image incident on the second surface.

Each of the first beam splitter and the second beam splitter may include a polarization beam splitter configured to reflect light having a first linearly polarized light component and transmit light having a second linearly polarized light component that is orthogonal to the first linearly polarized light component, and the third beam splitter may include a polarization beam splitter configured to transmit light having a first linearly polarized light component and reflect light having a second linearly polarized light component orthogonal to the first linearly polarized light component.

The third beam splitter may be configured to transmit the light from the second beam splitter and to reflect the light reflected from the second mirror.

The optical system may further include a first lens provided between the spatial light modulator and the first beam splitter, a second lens provided between the first beam splitter and the second beam splitter, and a third lens provided between the second beam splitter and the third beam splitter.

Each of the first lens and the second lens may include a convex lens, and the third lens may include a concave lens.

The optical system may further include a spatial filter provided between the first beam splitter and the second beam splitter proximate to a focal point of the first lens.

The first optical path may be provided between the spatial light modulator and the first mirror, a second optical path may be provided between the second beam splitter and the third beam splitter, and a third optical path may be provided between the second mirror and a viewer.

The first optical path and the third optical path may have different positions in the second direction, and the second optical path may be vertically provided between the first optical path and the third optical path in the second direction.

At least one of the first mirror and the second mirror may include a concave mirror.

The second mirror may include a concave mirror, and the optical system may be configured to form a real image of the first image between a focal point of the second mirror and the second mirror.

At least one of the first mirror and the second mirror may include a concave mirror.

The optical system may include a first beam splitter configured to reflect the light emitted from the light source towards the spatial light modulator and to transmit the light reflected from the spatial light modulator, a first mirror configured to reflect the light from the first beam splitter, a second beam splitter provided in the second direction from the first mirror, and a second mirror configured to reflect the light from the second beam splitter towards the second beam splitter.

The second beam splitter may be configured to reflect the light from the first mirror and to transmit the light reflected from the second mirror.

Each of the first beam splitter and the second beam splitter may include a polarization beam splitter configured to reflect light having a first linearly polarized light component and to transmit light having a second linearly polarized light component that is orthogonal to the first linearly polarized light component, and the optical system may further include a half-wave plate provided between the first beam splitter and the second beam splitter, and a quarter-wave plate provided between the second beam splitter and the second mirror.

The first beam splitter may include a polarization beam splitter configured to reflect light having a first linearly polarized light component and to transmit light having a second linearly polarized light component that is orthogonal to the first linearly polarized light component, and the second beam splitter may include a polarization beam splitter configured to transmit light having a first linearly polarized light component and to reflect light having a second linearly polarized light component, and the optical system may further include a quarter-wave plate provided between the second beam splitter and the second mirror.

The second beam splitter may be configured to transmit light from the first mirror and to reflect light reflected from the second mirror.

The spatial light modulator may include a transmissive spatial light modulator configured to transmit and modulate the light emitted from the light source.

The optical system may include a second beam splitter configured to transmit the light provided from the spatial light modulator, a first mirror configured to reflect the light transmitted through the second beam splitter towards the second beam splitter, a third beam splitter provided in the second direction from the second beam splitter, and a second mirror configured to reflect the light from the third beam splitter towards the third beam splitter.

The optical system may further include a first lens and a second lens provided between the spatial light modulator and the second beam splitter, a spatial filter provided between the first lens and the second lens, and a third lens provided between the second beam splitter and the third beam splitter.

Each of the first lens and the second lens may include a convex lens, and the third lens may include a concave lens.

The first optical path may be provided between the light source and the first mirror, the second optical path may be provided between the second beam splitter and the third beam splitter, and the third optical path may be provided between the second mirror and the viewer

BRIEF DESCRIPTION OF THE DRAWINGS

The above and/or other aspects, features, and advantages of example embodiments will be more apparent from the following description taken in conjunction with the accompanying drawings, in which.

DETAILED DESCRIPTION

Figure 1:
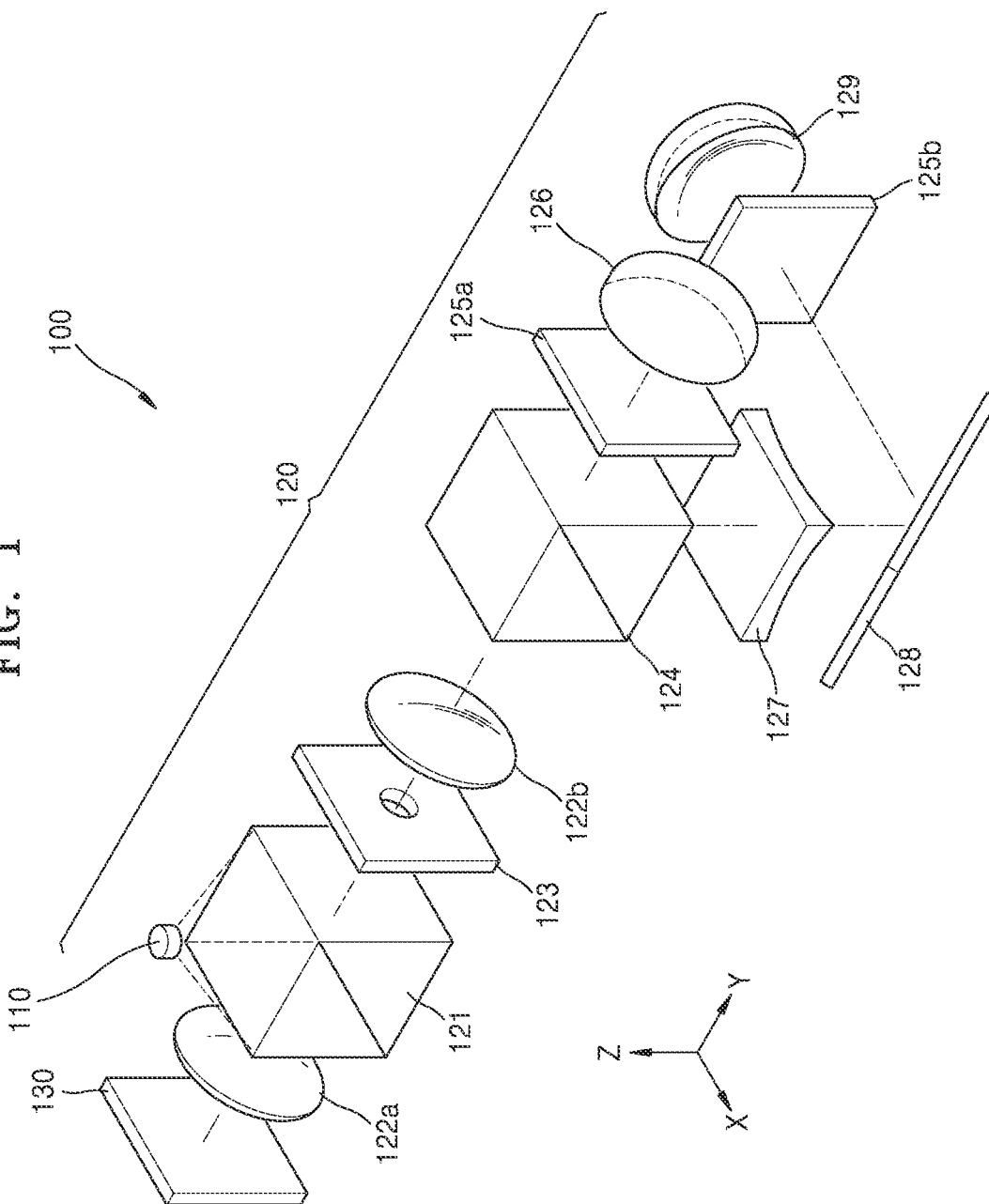
FIG. 1 is a perspective view illustrating a configuration of a multi-image display apparatus according to an example embodiment.

Hereafter, a multi-image display apparatus according to example embodiments will be described more fully with reference to the accompanying drawings. In the drawings, like reference numerals refer to like elements and a size of each element may be exaggerated for clarity and convenience of a description. Also, the following example embodiments described below are merely illustrative, and various modifications may be possible from the example embodiments. Also, in a layer structure described below, when a position of an element is described using an expression "above" or "on", the position of the element may include not only the element being "immediately on/under/left/right in a contact manner" but also being "on/under/left/right in a non-contact manner".

As used herein, the term "and/or" includes any and all combinations of one or more of the associated listed items. In addition, unless explicitly described to the contrary, the word "include," "comprise" and variations such as "includes," "comprises" or "comprising" will be understood to imply the inclusion of stated elements but not the exclusion of any other elements. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a perspective view showing a configuration of a multi-image display apparatus 100 according to an example embodiment. Referring to FIG. 1, the multi-image display apparatus 100 according to an example embodiment may include a light source 110, an optical system 120, and a spatial light modulator 130.

The light source 110 may be a coherent light source that emits coherent light. In order to provide light having high coherency, for example, a laser diode (LD) may be used as the light source 110. Also, the light source 110 may include a light-emitting diode (LED). An LED has lower spatial coherence than a laser, but light may be sufficiently diffracted and modulated by the spatial light modulator 130 as long as the light has a certain degree of spatial coherence. However the light source 110 is not limited thereto, and any other light source that may emit light having spatial coherence may be used as the light source 110.

Also, in the example embodiment shown in FIG. 1, the light source 110 may include a point light source that emits diverging light. A point light source, such as an LED or an LD, may be directly disposed at the location of the light source 110 shown in FIG. 1, but the point light source may be disposed on another location for convenience of design and light may be transmitted through an optical fiber. For example, an optical fiber end may be disposed at the location of the light source 110 depicted in FIG. 1. Also, in FIG. 1, the light source 110 is depicted as one component, but the light source 110 may include a plurality of LDs or LEDs that provide red, green, and blue light, respectively.

The spatial light modulator 130 may form a hologram pattern according to a hologram data signal, for example, a computer generated hologram (CGH) signal provided from an image processing apparatus. As a result of the diffraction of incident light emitted from the light source 110 and incident on the spatial light modulator 130 by the hologram pattern formed in the spatial light modulator 130, a holographic image having a three-dimensional effect may be reproduced. The spatial light modulator 130 may be one of a phase modulator capable of only performing phase modulation, an amplitude modulator capable of only performing amplitude modulation, and a complex modulator capable of performing both phase modulation and amplitude modulation. In FIG. 1, the spatial light modulator 130 may include a reflective spatial light modulator that diffracts and modulates incident light while reflecting light. For example, the spatial light modulator 130 may include a liquid crystal on silicon (LCoS), a digital micromirror device (DMD), or a semiconductor modulator.

The optical system 120 transmits a holographic image formed around the spatial light modulator 130 to the viewer's eyes. Also, the optical system 120 may be configured to transmit an external scene to the viewer's eye together with the holographic image. The characteristics of the multi-image display apparatus 100, such as a viewing angle of a holographic image, an image quality of an image, the size of the multi-image display apparatus 100, etc. may vary according to the design of the optical system 120.

In the example embodiment depicted in FIG. 1, the optical system 120 includes a first beam splitter 121 and a second beam splitter 124 facing each other, a first mirror 126 that reflects light transmitted through the second beam splitter 124, a third beam splitter 128 disposed below the second beam splitter 124, and a second mirror 129 that re-reflects the light reflected from the third beam splitter 128.

The first beam splitter 121 may be disposed so that two different surfaces of the first beam splitter 121 face the light source 110 and the spatial light modulator 130, respectively. For example, the light source 110 may be disposed in a +z direction with respect to the first beam splitter 121, and the spatial light modulator 130 may be disposed in a −y direction with respect to the first beam splitter 121. The first beam splitter 121 may be configured to reflect light emitted from the light source 110 to the spatial light modulator 130 and to transmit the light reflected from the spatial light modulator 130 to the second beam splitter 124. Accordingly, the light reflected from the spatial light modulator 130 may pass through the first beam splitter 121 and travel in a +y direction toward the second beam splitter 124.

The second beam splitter 124 and the first mirror 126 may be sequentially disposed in the +y direction away from the first beam splitter 121. The second beam splitter 124 may be configured to transmit light reflected from the spatial light modulator 130 and to reflect the light reflected from the first mirror 126 in a −z direction, that is, downward in FIG. 1. Accordingly, light reflected by the spatial light modulator 130 may reach the first mirror 126 after passing through the first beam splitter 121 and the second beam splitter 124. Afterwards, the light is reflected by the first mirror 126, the light is re-reflected by the second beam splitter 124, and enters the third beam splitter 128.

The third beam splitter 128 may be disposed to face the second beam splitter 124 in the −z direction. Also, the second mirror 129 may be disposed to face the third beam splitter 128 in an −x direction. The third beam splitter 128 may be configured to reflect light reflected from the second beam splitter 124 to the second mirror 129 and to transmit the light reflected from the second mirror 129. In this way, light reflected from the second mirror 129 may reach the viewer's eyes after transmitting through the third beam splitter 128. Also, the second mirror 129 may be configured to transmit light traveling in a +x direction from the outside. Then, a viewer's eyes may see an external scene through the second mirror 129.

The first beam splitter 121, the second beam splitter 124, and the third beam splitter 128 may include semi-transmissive mirrors that simply reflect half of incident light and transmit the other half. When the first beam splitter 121, the second beam splitter 124, and the third beam splitter 128 include semi-transmissive mirrors, the first quarter wave plate 125*a* and the second quarter wave plate 125*b* described below may be omitted from the optical system 120. To use light more efficiently, the first beam splitter 121, the second beam splitter 124, and the third beam splitter 128 may include polarization beam splitters that transmit or reflect incident light according to the polarization state of incident light.

Figure 2:
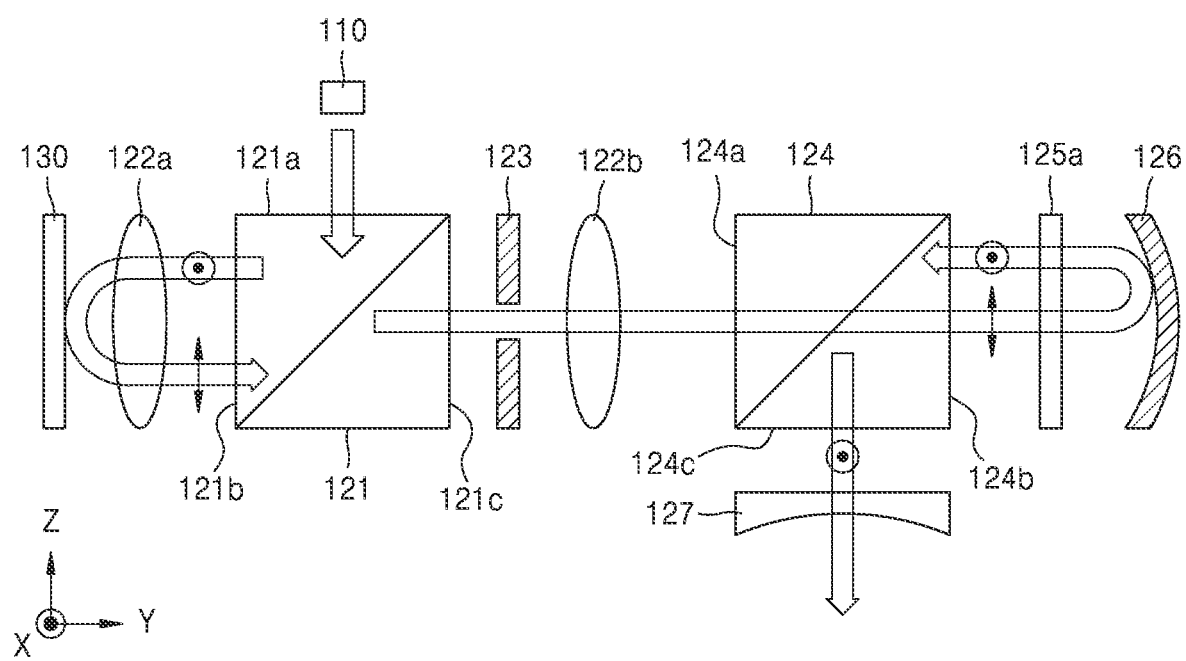
FIG. 2 is a cross-sectional view taken along a direction illustrating an arrangement of some components of the multi-image display apparatus of FIG. 1.

FIG. 2 is a cross-sectional view taken along a direction illustrating an arrangement of some of the components of the multi-image display apparatus 100 of FIG. 1. For example, FIG. 2 is a cross-sectional view of the optical system 120 with a plane including a z-axis and a y-axis to show the components from the spatial light modulator 130 disposed in the +y direction to the first mirror 126.

Referring to FIG. 2, the light source 110 is disposed to face a first surface 121*a* of the first beam splitter 121. Accordingly, light emitted from the light source 110 is incident on the first surface 121*a* of the first beam splitter 121. The first beam splitter 121 may be a polarization beam splitter that reflects light having a first linearly polarized light component and transmits light having a second linearly polarized light component orthogonal to the first linearly polarized light component. In this case, of light emitted from the light source 110, light having the first linearly polarized light component is reflected by the first beam splitter 121 and light having the second linearly polarized light component may be transmitted through the first beam splitter 121.

The light having the first linearly polarized light component reflected by the first beam splitter 121 is emitted through a second surface 121*b* of the first beam splitter 121 and enters the spatial light modulator 130. The spatial light modulator 130 is disposed facing the second surface 121*b* of the first beam splitter 121. Also, the optical system 120 may further include a first lens 122*a* between the second surface 121*b* of the first beam splitter 121 and the spatial light modulator 130. Light emitted from the light source 110 may be a diverging beam in which a beam diameter gradually increases in a traveling direction of light. The first lens 122*a* may make light incident from the first beam splitter 121 parallel light having a constant beam diameter. For this reason, the first lens 122*a* may be a convex lens. Accordingly, the parallel light having a constant beam diameter enters the spatial light modulator 130.

The spatial light modulator 130 modulates and reflects incident light, and the modulated light interferes with each other to form a holographic image. Then, when the light is modulated by the spatial light modulator 130, the light is rotated 90 degrees and has the second linearly polarized light component. In this way, the light including the holographic image re-enters the second surface 121*b* of the first beam splitter 121. At this point, the light is focused while passing through the first lens 122*a*. Accordingly, the beam diameter of the light is gradually reduced in a traveling direction of light. Light having the second linearly polarized light component is transmitted through the first beam splitter 121 and is emitted through a third surface 121*c* of the first beam splitter 121 facing the second surface 121*b*. Thus, the light may enter a first surface 124*a* of the second beam splitter 124.

The optical system 120 may further include a spatial filter 123 and a second lens 122*b* disposed on an optical path between the first beam splitter 121 and the second beam splitter 124. The spatial filter 123 removes unnecessary light components other than the holographic image. The spatial filter 123 and the second lens 122*b* may be disposed near a focal point of the first lens 122*a*. In FIG. 2, the spatial filter 123 is disposed ahead in the traveling direction of light, and the second lens 122*b* is disposed behind the spatial filter 123, but embodiments are not limited thereto. For example, the second lens 122*b* may be disposed ahead in the traveling direction of light, and the spatial filter 123 may be disposed behind the second lens 122*b*.

Light focused by the first lens 122*a* becomes a divergent beam in which a beam diameter is gradually increased again as it passes through the focal point of the first lens 122*a*, but the second lens 122*b* may suppress the beam diameter of light entering the first surface 124*a* of the second beam splitter 124 not to be excessively increased. For example, the second lens 122*b* may make light incident on the first surface 124*a* of the second beam splitter 124 parallel light or a divergent beam with a slowly increasing beam diameter. For this reason, the second lens 122*b* may be a convex lens.

The second beam splitter 124 is a polarization beam splitter that reflects light having a first linearly polarized light component and transmits light having a second linearly polarized light component orthogonal to the first linearly polarized light component. Accordingly, light of the second linearly polarized light component incident on the first surface 124*a* of the second beam splitter 124 from the first beam splitter 121 is transmitted through the second beam splitter 124 and is emitted through the second surface 124*b* facing the first surface 124*a* of the second beam splitter 124. The first mirror 126 is disposed facing the second surface 124*b* of the second beam splitter 124. Accordingly, light emitted through the second surface 124*b* of the second beam splitter 124 may enter the first mirror 126.

The optical system 120 may further include a first quarter-wave plate 125*a* disposed on an optical path between the second surface 124*b* of the second beam splitter 124 and the first mirror 126. The first quarter-wave plate 125*a* delays incident light by a quarter wavelength of the incident light. Accordingly, light having a first linearly polarized light component is converted into light having a first circularly polarized light component by the first quarter-wave plate 125*a*, and light having the first circularly polarized light component is converted into light having the first linearly polarized light component by the first quarter wave plate 125*a*. Also, light having a second linearly polarized light component is converted into light having a second circularly polarized light component by the first quarter-wave plate 125*a*, and light having the second circularly polarized light component is converted into light having the second linearly polarized light component by the first quarter-wave plate 125*a*.

Light emitted through the second surface 124*b* of the second beam splitter 124 has a second circularly polarized light component while passing through the first quarter-wave plate 125*a*. Light having a second circularly polarized light component is reflected in an opposite direction, that is, in a direction of 180 degrees with respect to the incidence direction by the first mirror 126. At this time, the polarized component of the light reflected by the first mirror 126 is converted into a first circularly polarized light component.

Then, the light may have a first linearly polarized light component while passing through the first quarter-wave plate 125a again. Afterwards, light having the first linearly polarized light component enters the second surface 124b of the second beam splitter 124 and is reflected by the second beam splitter 124.

The light reflected by the second beam splitter 124 is emitted through a third surface 124c of the second beam splitter 124. The optical system 120 may further include a third lens 127 disposed to face the third surface 124c of the second beam splitter 124. According to the example embodiment, the first mirror 126 may be a concave mirror having a concave reflecting surface. Accordingly, the first mirror 126 may make the reflected light into a converging beam in which a beam diameter is gradually reduced in a traveling direction of light. The third lens 127 converts the converging beam back into a diverging beam to increase a viewing angle of the holographic image seen by the viewer. For this reason, the third lens 127 may be a concave lens.

Figure 3:
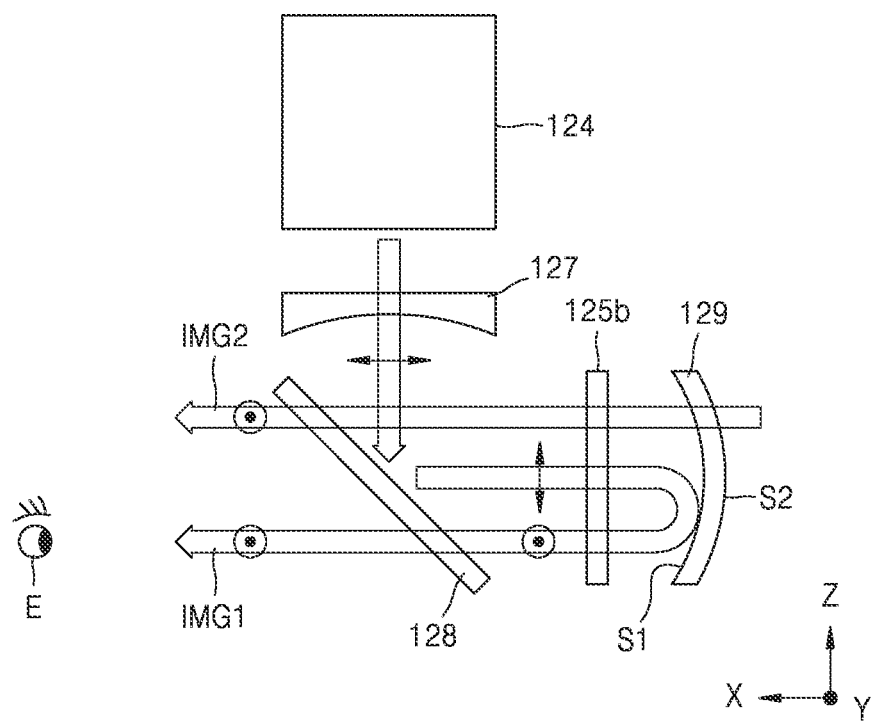
FIG. 3 is a cross-sectional view taken along another direction illustrating an arrangement of some other components of the multi-image display apparatus of FIG. 1.

FIG. 3 is a cross-sectional view taken along another direction illustrating an arrangement of some other components of the multi-image display apparatus 100 of FIG. 1. For example, FIG. 3 is a cross-sectional view of the optical system 120 taken along a plane including the z-axis and the x-axis in FIG. 1 to specifically show a path of light from the second beam splitter 124 to the viewer's eyes. The cross-sectional view of FIG. 3 is rotated by 90 degrees with respect to the cross-sectional view of FIG. 2, and thus, in FIG. 3, a linearly polarized light component is displayed in reverse to FIG. 2. For example, although the first linearly polarized light component is represented by '⊙' and the second linearly polarized light component by '↕' in FIG. 2, in FIG. 3, the first linearly polarized light component is represented by '↕' and '⇔' and the second linearly polarized light component is represented by '⊙'.

Referring to FIG. 3, light of the first linearly polarized light component reflected by the second beam splitter 124 and passing through the third lens 127 enters the third beam splitter 128. Like the first and second beam splitters 121 and 124, the third beam splitter 128 is a polarized light beam splitter that reflects light having the first linearly polarized light component and transmits light having the second linearly polarized light component orthogonal to the first linearly polarized light component. In FIG. 2, the first beam splitter 121 and the second beam splitter 124 are shown as a cube, and in FIG. 3, the third beam splitter 128 is shown as a flat plate, but the present embodiment is not limited thereto. The first beam splitter 121, the second beam splitter 124, and the third beam splitter 128 may be selected in a cube shape or a flat plate shape depending on the needs of the assembly process of the optical system 120.

Light of the first linearly polarized light component reflected by the third beam splitter 128 enters the second mirror 129. The optical system 120 may further include a second quarter-wave plate 125b disposed on an optical path between the third beam splitter 128 and the second mirror 129. Accordingly, light of the first linearly polarized light component is converted into light of the first circularly polarized light component while passing through the second quarter-wave plate 125b. The light having the first circularly polarized light component is reflected in the opposite direction, that is, in a direction of 180 degrees with respect to an incidence direction by the second mirror 129. At this time, the polarized light component of the light reflected by the second mirror 129 is converted into the second circularly polarized light component. Then, the light has a second linearly polarized light component while passing through the second quarter-wave plate 125b again. Afterwards, the light having the second linearly polarized light component is transmitted through the third beam splitter 128 to enter a viewer's eye E. According to the example embodiment, the second mirror 129 may be a concave mirror having a concave reflecting surface for converging reflected light. Accordingly, a holographic image IMG1 can be provided to a pupil of the viewer's eye E through the second mirror 129.

The second mirror 129 may also be a semi-transmissive mirror that transmits a portion of incident light and reflects a remaining portion of the incident light. Then, light including an external scene may be transmitted through the second mirror 129 and the third beam splitter 128 and may enter the viewer's eye E as an external image IMG2. For example, the second mirror 129 includes a first surface S1 facing the third beam splitter 128 and a second surface S2 facing the first surface S1 and may reflect the holographic image IMG1 incident on the first surface S1 and transmit the external image IMG2 incident on the second surface S2.

Instead, the second mirror 129 may be a polarization-selective mirror that reflects light having a first circularly polarized light component and transmits light having a second circularly polarized light component. In this case, light of the first circularly polarized light component including the holographic image IMG1 is reflected by the first surface S1 of the second mirror 129. On the other hand, of light including the external image IMG2, the light of the second circularly polarized light component passes through the second surface S2 of the second mirror 129, and afterwards, may have a second linearly polarized light component while passing through the second quarter-wave plate 125b. Afterwards, light including the external image IMG2 converted into the second linearly polarized light component may enter the viewer's eye E through the third beam splitter 128.

Instead, the second mirror 129 may be configured to reflect light incident on the first surface S1 and transmit light incident on the second surface S2. In this case, the light including the external image IMG2 that entered the second surface S2 of the second mirror 129 enters the third beam splitter 128 after passing through the second mirror 129 and the second quarter wave-plate 125b. Of the light including the external image IMG2, light having the second linearly polarized light component may enter the viewer's eye E through the third beam splitter 128.

As described with reference to FIGS. 2 and 3, the optical system 120 may include an optical path having three different directions. For example, the optical system 120 may include a first optical path in a y-direction between the spatial light modulator 130 and the first mirror 126, a second optical path in a z-direction between the second beam splitter 124 and the third beam splitter 128, and a third optical path in an x-direction between the second mirror 129 and the viewer. The direction of the first optical path, the direction of the second optical path, and the direction of the third optical path are orthogonal to each other. Also, the first optical path, the second optical path, and the third optical path have different positions in a height direction. For example, the third optical path is located at a lower position than the first optical path, and the second optical path is vertically formed between the first optical path and the third optical path. Through the arrangement of the optical paths described above, a form factor of the multi-image display apparatus 100 may be formed to be relatively small. Finally, the holographic image IMG1 and the external image IMG2 may be provided to the viewer's eye E along the third optical path.

According to the example embodiment, the holographic image IMG1 reproduced by the spatial light modulator 130 and the external image IMG2 including the actual external scene may be simultaneously provided to the viewer's eye. Then, the user may view the holographic image IMG1 including virtual reality or virtual information together with a background subject of the real world that the user is actually facing. Accordingly, the multi-image display apparatus 100 according to the example embodiment may be applied to realize augmented reality (AR) or mixed reality (MR). In this case, the multi-image display apparatus 100 according to the example embodiment may be a near-eye AR display apparatus.

Figure 4:
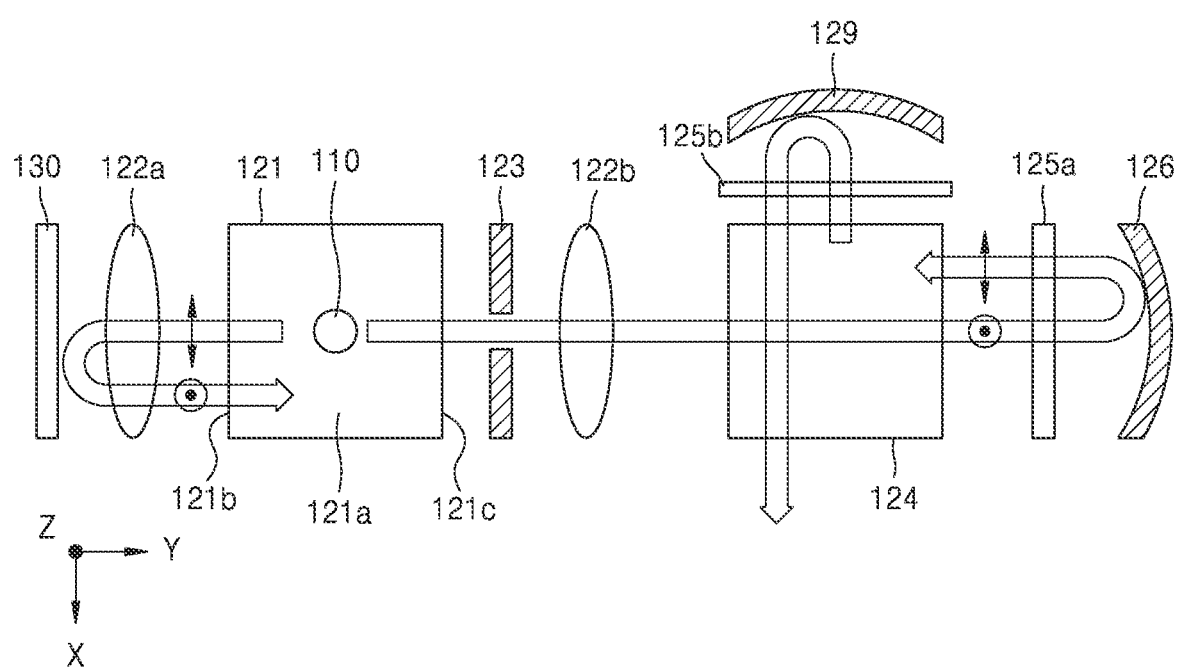
FIG. 4 is a diagram of a configuration in still another direction of the multi-image display apparatus of FIG. 1.

Also, FIG. 4 is a diagram of the configuration in still another direction of the multi-image display apparatus 100 depicted in FIG. 1. For example, FIG. 4 shows the multi-image display apparatus 100 of FIG. 1 viewed from the top in the −z-axis direction, and some configurations are shown in cross-section shapes. The direction depicted in FIG. 4 is rotated by 90 degrees with respect to the direction depicted in FIG. 2, and thus, the linearly polarized light component in FIG. 4 is displayed in reverse to FIG. 2. For example, in FIG. 2, the first linearly polarized light component is represented by '⊙' and the second linearly polarized light component is represented by '↕', but in FIG. 4, the first linearly polarized light component is represented by '↕' and the second linearly polarized light component is represented by '⊙'.

Referring to FIG. 4, the light source 110 may face an upper surface of the first beam splitter 121, that is, the center of the first surface 121a. As described above, light emitted from the light source 110 may enter a viewer's eye and may pass through the first beam splitter 121, the first lens 122a, the spatial light modulator 130, the first lens 122a, the first beam splitter 121, the spatial filter 123, the second lens 122b, the second beam splitter 124, the first quarter-wave plate 125a, the first mirror 126, the first quarter-wave plate 125a, the second beam splitter 124, the third lens 127 (refer to FIGS. 2 and 3), the third beam splitter 128 (refer to FIG. 3), the second quarter-wave plate 125b, the second mirror 129, the second quarter-wave plate 125b, and the third beam splitter 128.

Here, the spatial light modulator 130, the first lens 122a, the first beam splitter 121, the spatial filter 123, the second lens 122b, the second beam splitter 124, the first quarter-wave plate 125a, and the first mirror 126 may be disposed in a row on the same layer. The light source 110 is disposed above the first beam splitter 121 and the third lens 127 is disposed below the second beam splitter 124. The third beam splitter 128, the second quarter-wave plate 125b, and the second mirror 129 may be disposed in a row on the same layer below the third lens 127. In particular, the third beam splitter 128, the second quarter-wave plate 125b, and the second mirror 129 may be disposed on the same layer as the viewer's eye E. Also, a direction in which the spatial light modulator 130, the first lens 122a, the first beam splitter 121, the spatial filter 123, the second lens 122b, the second beam splitter 124, the first quarter-wave plate 125a, and the first mirror 126 are disposed is orthogonal to a direction in which the third beam splitter 128, the second quarter-wave plate 125b, and the second mirror 129 are disposed. For example, in FIG. 1, light travels from the spatial light modulator 130 to the first mirror 126 in the y direction, and light between the third beam splitter 128 and the second mirror 129 travels in the x direction.

Since the multi-image display apparatus 100 according to the example embodiment provides a three-dimensional holographic image together with an actual external scene, the multi-image display apparatus 100 may provide a more realistic augmented reality experience. Also, the multi-image display apparatus 100 according to the example embodiment described above may increase a length of an optical path in a narrow space by using the first beam splitter 121, the second beam splitter 124, and the third beam splitter 128, and thus, may have a relatively small form factor, thereby reducing the size thereof. Accordingly, the volume and weight of the multi-image display apparatus 100 may be reduced, thereby enhancing convenience for the user. Also, the multi-image display apparatus 100 according to the example embodiment described above may realize a relatively wide viewing angle of about 60 degrees.

Figure 5:
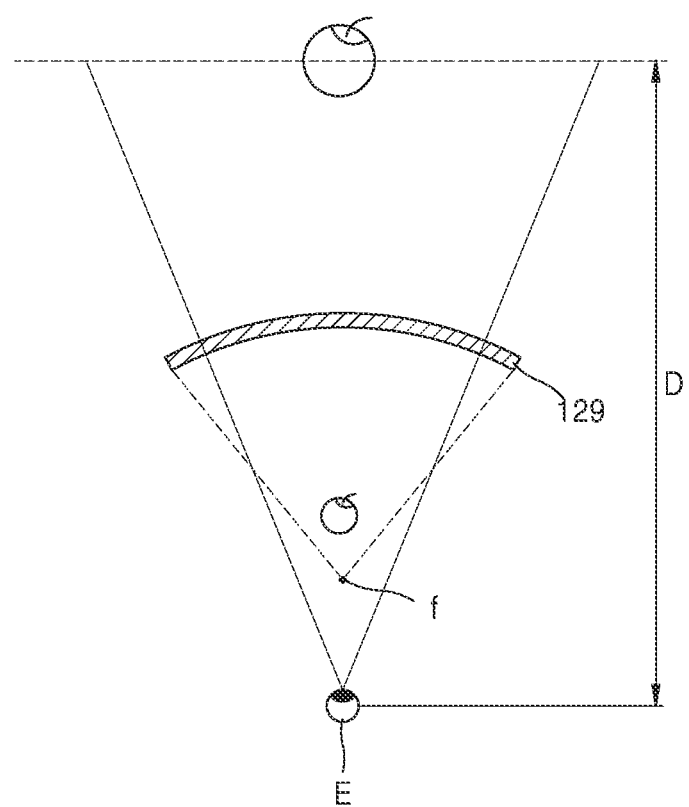
FIGS. 5 and 6 are diagrams showing a principle of controlling a depth of a holographic image seen by a viewer in the multi-image display apparatus of FIG. 1.
Figure 6:
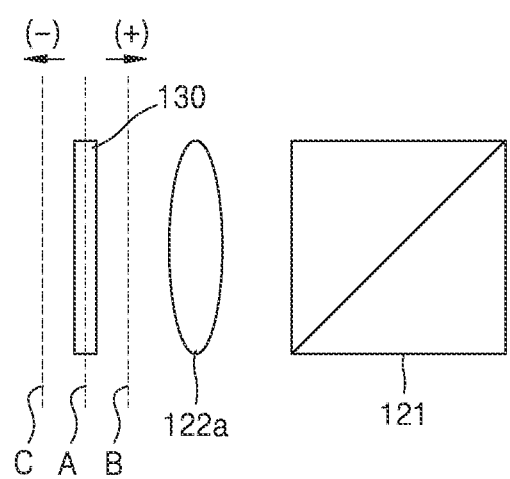

For example, FIGS. 5 and 6 are diagrams showing a principle of controlling a depth of a holographic image seen by a viewer in the multi-image display apparatus 100 of FIG. 1. In FIG. 5, f represents a focal point of the second mirror 129. When parallel light enters the second mirror 129, the light reflected by the second mirror 129 is collected at the focal point f. However, since the light diverged by the third lens 127, which is a concave lens, enters the second mirror 129, light may be focused on the viewer's eye E, which is located farther from the second mirror 129 than the focal point f. Meanwhile, a real image may be formed between the second mirror 129 and the focal point f by controlling the refractive powers of the optical components, such as the first lens 122a, the second lens 122b, the first mirror 126, and the third lens 127. Then, an enlarged virtual image formed at a distance D from the viewer is seen by the viewer's eye E. Accordingly, the multi-image display apparatus 100 may realize a relatively wide viewing angle.

A depth of the reproduced holographic image, that is, the distance D, may be controlled by the location of an actual image formed around the spatial light modulator 130. Referring to FIG. 6, a hologram data signal provided from an image processing apparatus to the spatial light modulator 130 includes depth information of a holographic image to be reproduced. The location of the holographic plane of the image formed around the spatial light modulator 130 is changed according to the depth information. Then, the location of an actual image relayed by the optical system 120 on the optical path between the second mirror 129 and the focal point f thereof from a holographic plane is changed, and as a result, a distance by which an enlarged virtual image is viewed by the viewer is changed.

For example, when the location of the holographic plane coincides with the location of the spatial light modulator 130 as indicated by 'A', the location of the holographic plane may be defined as 0 (zero). Also, when the holographic plane is located in a direction in which light travels from a reflection surface of the spatial light modulator 130 as indicated by 'B', it may be defined that the location value of the holographic plane has a positive sign (+). Also, when the holographic plane is located in a direction opposite to the direction in which light travels from the reflection surface of the spatial light modulator 130 as indicated by 'C', it may be defined that the location value of the holographic plane has a negative sign (−).

Figure 7:
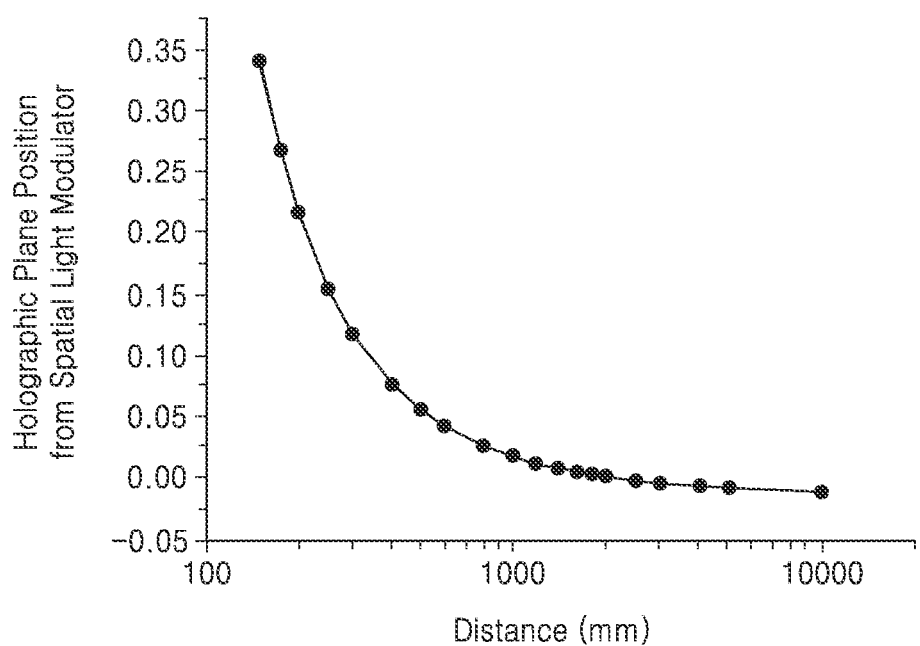
FIG. 7 is a graph showing a relationship between the location change of an image formed around a spatial light modulator and a depth of a holographic image seen by a viewer.

FIG. 7 is a graph showing an example relationship between the location change of an image formed around the spatial light modulator 130 and a depth of a holographic image seen by a viewer. Referring to FIG. 7, as the location value of the holographic plane increases in the positive (+) direction, that is, as the holographic plane moves away from the reflection surface of the spatial light modulator 130 in a direction in which light travels, the virtual image of the reproduced holographic image is viewed closer to the viewer and the distance D is reduced. Also, as the location value of the holographic plane increases in the negative (−) direction, that is, the holographic plane is moved away from the reflective surface of the spatial light modulator 130 in a direction opposite to the direction in which light travels, the virtual image of the reproduced holographic image is viewed at a distance from the viewer and the distance D is increased.

Figure 8:
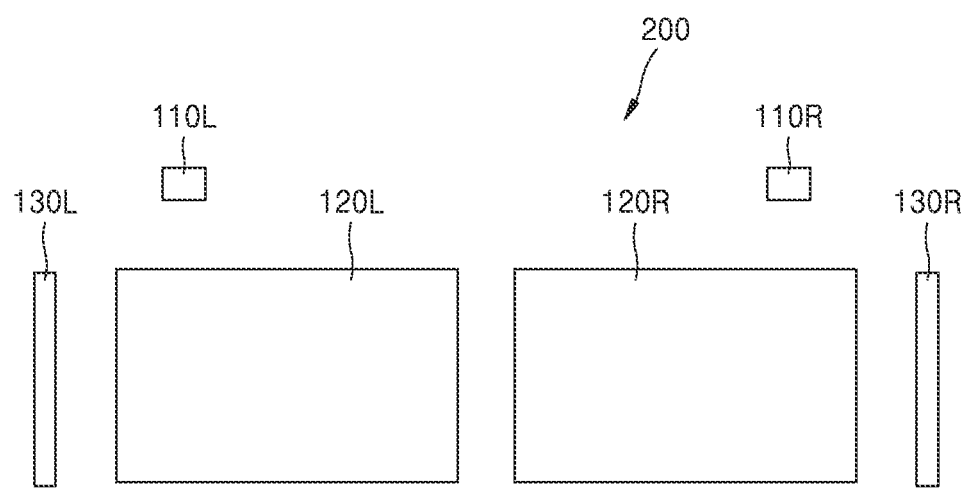
FIG. 8 is a block diagram of a configuration of a multi-image display apparatus according to an example embodiment.

FIG. 8 is a block diagram of a configuration of a multi-image display apparatus 200 according to an example embodiment. Referring to FIG. 8, the multi-image display apparatus 200 may include a left eye light source 110L, a left eye optical system 120L, a left eye spatial light modulator 130L, a right eye light source 110R, a right eye optical system 120R, and a right eye spatial light modulator 130R. The configurations of the left eye optical system 120L and the right eye optical system 120R may be the same as the configuration of the optical system 120 described with reference to FIGS. 1 through 4. The optical components in the left eye optical system 120L may be disposed in an opposite direction to the optical components in the right eye optical system 120R, that is, symmetrically disposed.

Also, the configurations of the left eye light source 110L and the right eye light source 110R may be the same as the configuration of the light source 110 described with reference to FIGS. 1 through 4, and the configurations of the left eye spatial light modulator 130L and the right eye spatial light modulator 130R may be the same as the configuration of the spatial light modulator 130 described with reference to FIGS. 1 through 4. The left eye spatial light modulator 130L and the right eye spatial light modulator 130R may reproduce holographic images of different viewpoints according to the control of an image processing apparatus. For example, the left eye spatial light modulator 130L may reproduce a holographic image having a left eye viewpoint of a viewer, and the right eye spatial light modulator 130R may reproduce a holographic image having a right eye viewpoint of the viewer. The multi-image display apparatus 200 may provide a virtual holographic image together with an image including an actual external scene in both eyes of a viewer.

The configuration of the optical system 120 described with reference to FIGS. 1 through 4 may be modified in various ways as needed. For example, the order of some optical elements in the optical system 120 described with reference to FIGS. 1 through 4 may be changed as necessary. Also, in a light path between the light source 110 and an eye E of a viewer, the polarization state of light may be differently selected from the polarization state described with reference to FIGS. 1 through 4 by differently selecting the characteristics of polarization dependent components or by arranging additional polarization selective components. Also, an optical path may further be bent by additionally arranging a mirror on the optical path between the light source 110 and the viewer's eye E.

Figure 9:
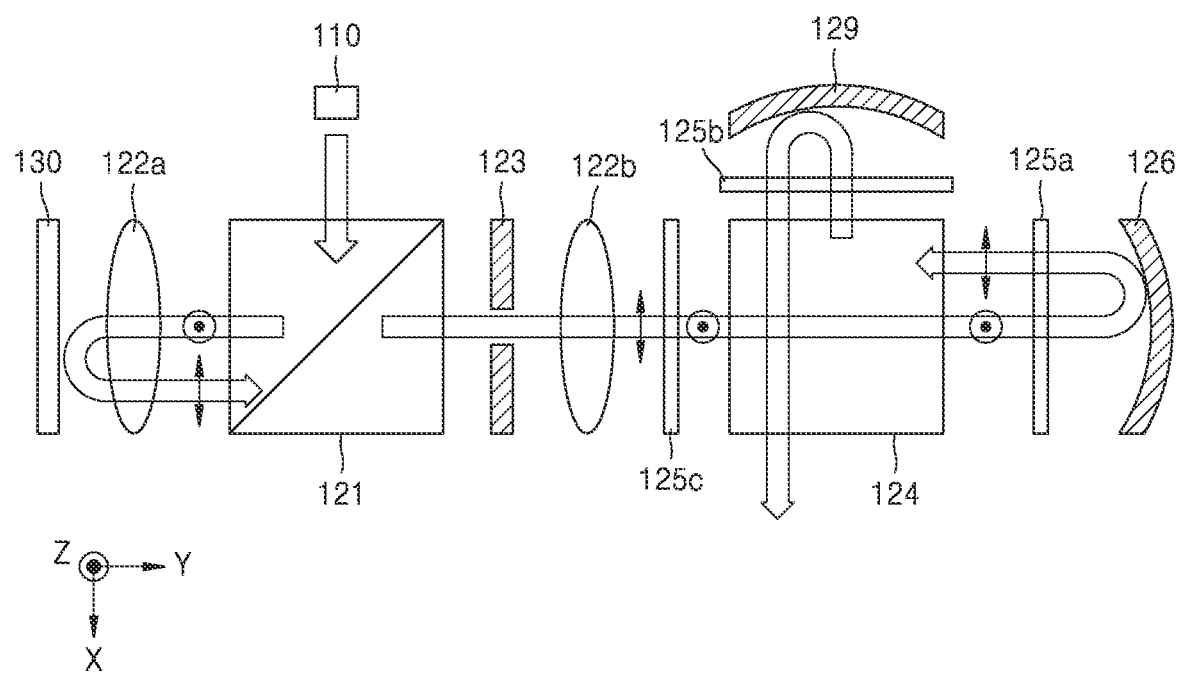
FIG. 9 is a diagram illustrating an arrangement of some components among components of a multi-image display apparatus according to an example embodiment.

FIG. 9 is a diagram illustrating an arrangement of some components of a multi-image display apparatus according to an example embodiment. FIG. 9 shows the multi-image display apparatus downwardly viewed from the top, and some configurations are shown in cross-section shapes. In the example embodiment described above with reference to FIG. 4, the light source 110 is disposed on an upper surface of the first beam splitter 121 in a +z direction, but the location of the light source 110 is not limited thereto. As depicted in FIG. 9, the light source 110 may be disposed on a side surface of the first beam splitter 121 in a −x direction. In this case, the first beam splitter 121 depicted in FIG. 9 is rotated by 90 degrees with respect to an optical axis when compared with the first beam splitter 121 depicted in FIG. 4. Then, the first beam splitter 121 may reflect light of a second linearly polarized light component incident on a side surface thereof in a direction towards the spatial light modulator 130. Also, the first beam splitter 121 may transmit light of a first linearly polarized light component reflected by the spatial light modulator 130.

In the example embodiment depicted in FIG. 9, the optical configuration after the second beam splitter 124 may be the same as the embodiment depicted in FIG. 4. The second beam splitter 124 reflects light having the first linearly polarized light component and transmits light having the second linearly polarized light component. Accordingly, a half-wave plate 125c may further be disposed in front of the second beam splitter 124. In FIG. 9, it is depicted that the half-wave plate 125c is disposed between the second lens 122b and the second beam splitter 124, but the half-wave plate 125c may be disposed on an optical path between the first beam splitter 121 and the second beam splitter 124. Light of the first linearly polarized light component transmitted through the first beam splitter 121 is converted into light of the second linearly polarized light component while passing through the half-wave plate 125c. Afterwards, the light of the second linearly polarized light component is transmitted through the second beam splitter 124 and is incident on the first mirror 126.

Instead, the light source 110 may be disposed on a lower surface of the first beam splitter 121 in a −z direction. In this case, the light source 110 and the third lens 127 (refer to FIG. 2) may be disposed on the same side with respect to the optical axis of the optical system. Also, the first beam splitter 121 is rotated by 180 degrees with the optical axis as a rotation axis when compared with the first beam splitter 110 depicted in FIG. 4, and may reflect light of the first linearly polarized light component incident on a lower surface thereof in a direction towards the spatial light modulator 130.

Figure 10:
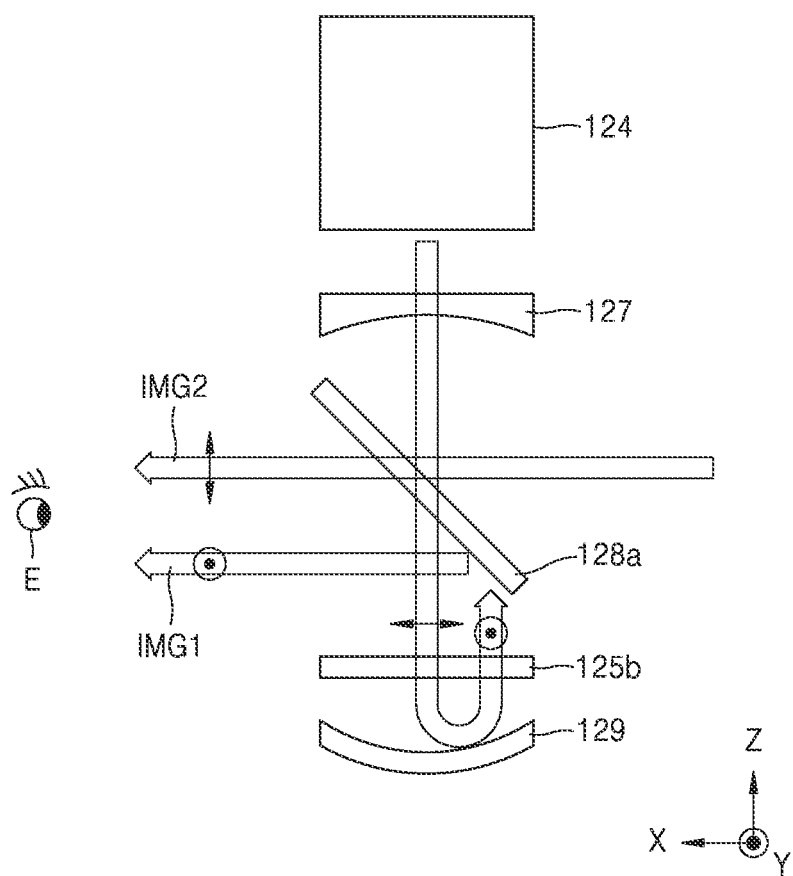
FIG. 10 is a cross-sectional view illustrating an arrangement of some components of a multi-image display apparatus according to an example embodiment.

FIG. 10 is a cross-sectional view illustrating an arrangement of some components of a multi-image display apparatus according to an example embodiment. In FIG. 10, the multi-image display apparatus is depicted in the same direction as the direction of the multi-image display apparatus of FIG. 3. In the example embodiment of FIG. 3, it is explained that the third beam splitter 128 reflects the light of the first linearly polarized light component and transmits the light of the second linearly polarized light component. However, embodiments are not limited thereto. In the example embodiment depicted in FIG. 10, the third beam splitter 128a may be configured to transmit light of a first linearly polarized light component and reflect light of a second linear polarized light component. In the example embodiment depicted in FIG. 10, the remaining configuration of the optical system except for the third beam splitter 128a may be the same as the optical system 120 depicted in FIGS. 2 and 3. In this case, the second quarter-wave plate 125b and the second mirror 129 may be disposed on a lower side of the third beam splitter 128a in a −z direction.

Then, light of the first linearly polarized light component reflected by the second beam splitter 124 and passed through the third lens 127 is transmitted through the third beam splitter 128a and the second quarter-wave plate 125b and enters the second mirror 129. At this time, the light has a first circularly polarized light component. Light having the first circularly polarized light component is reflected in an opposite direction by the second mirror 129 and is converted into a second circularly polarized light component. Then, the light may have a second linearly polarized light component by passing through the second quarter-wave plate 125b again. Light having the second linearly polarized light component is reflected by the third beam splitter 128a and enters the eye E of the viewer.

Of light including an external scene, light having the first linearly polarized light may enter the viewer's eye E through the third beam splitter 128a. Accordingly, a holographic image IMG1 includes a second linearly polarized light component and an external image IMG2 includes a first linearly polarized light component. In the example embodiment depicted in FIG. 3, both the holographic image IMG1 and the external image IMG2 have a second linearly polarized light component.

Figure 11:
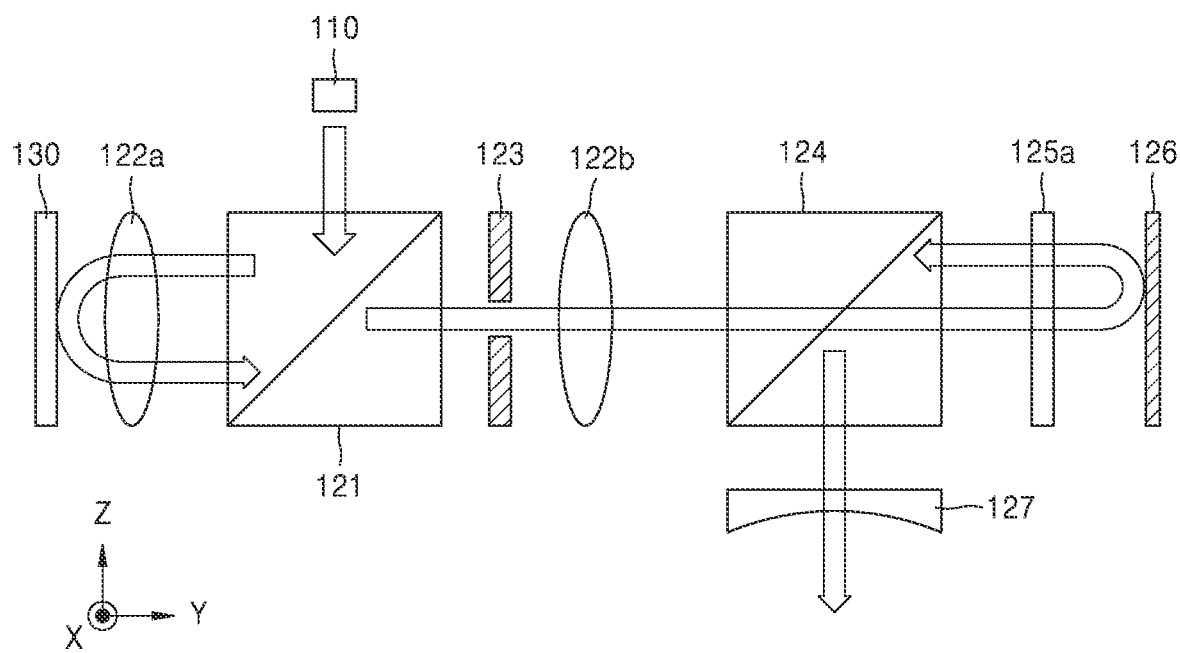
FIG. 11 is a sectional view illustrating an arrangement of some components of a multi-image display apparatus according to an example embodiment.

According to example embodiments, the first mirror 126 and the second mirror 129 may be concave mirrors having positive (+) refractive power. However, embodiments are not limited thereto, and either or both of the first mirror 126 and the second mirror 129 may be a plane mirror. For example, FIG. 11 is a cross-sectional view illustrating an arrangement of some components of a multi-image display apparatus according to an example embodiment. In FIG. 11, the multi-image display apparatus is depicted in the same direction as the direction of the multi-image display apparatus of FIG. 2. Referring to FIG. 11, the first mirror 126 of the multiple image display apparatus may be a plane mirror. When the first mirror 126 is a plane mirror, the curvatures of the first lens 122a, the second lens 122b, and the third lens 127 and the second mirror 129 may be controlled so that a holographic image is more accurately provided to the viewer's eye E.

Figure 12:
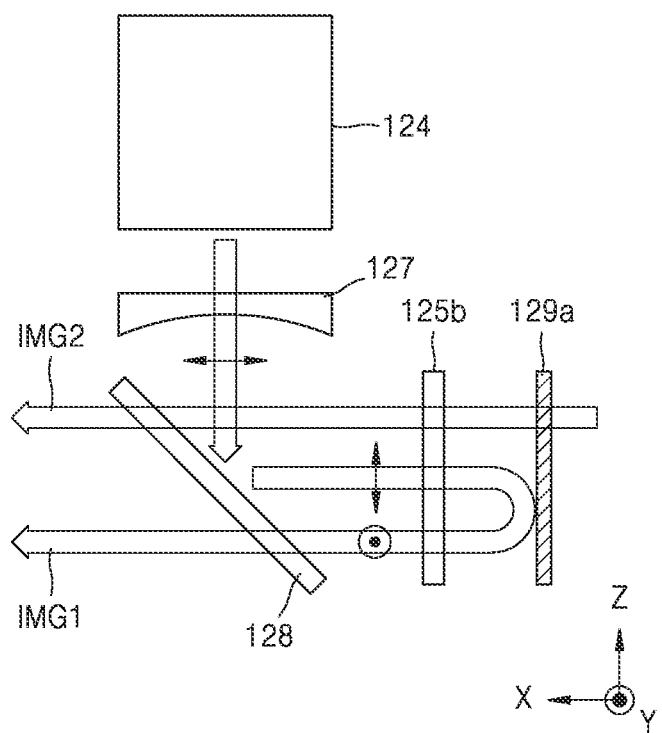
FIG. 12 is a cross-sectional view illustrating an arrangement of some components of a multi-image display apparatus according to an example embodiment.

Also, FIG. 12 is a cross-sectional view illustrating an arrangement of some components of a multi-image display apparatus according to an example embodiment. In FIG. 12, the multi-image display apparatus is depicted in the same direction as the direction of the multi-image display apparatus of FIG. 3. Referring to FIG. 12, the second mirror 129 of the multiple image display apparatus may be a plane mirror. When the second mirror 129 is a plane mirror, the curvatures of the first lens 122a, the second lens 122b, and the third lens 127 and the first mirror 126 may be controlled so that a holographic image is more accurately provided to the viewer's eye E. Instead, both the first mirror 126 and the second mirror 129 may be plane mirrors. In this case, a holographic image may be more accurately provided to the viewer's eye E by controlling the curvatures of the first lens 122a, the second lens 122b, and the third lens 127.

Figure 13:
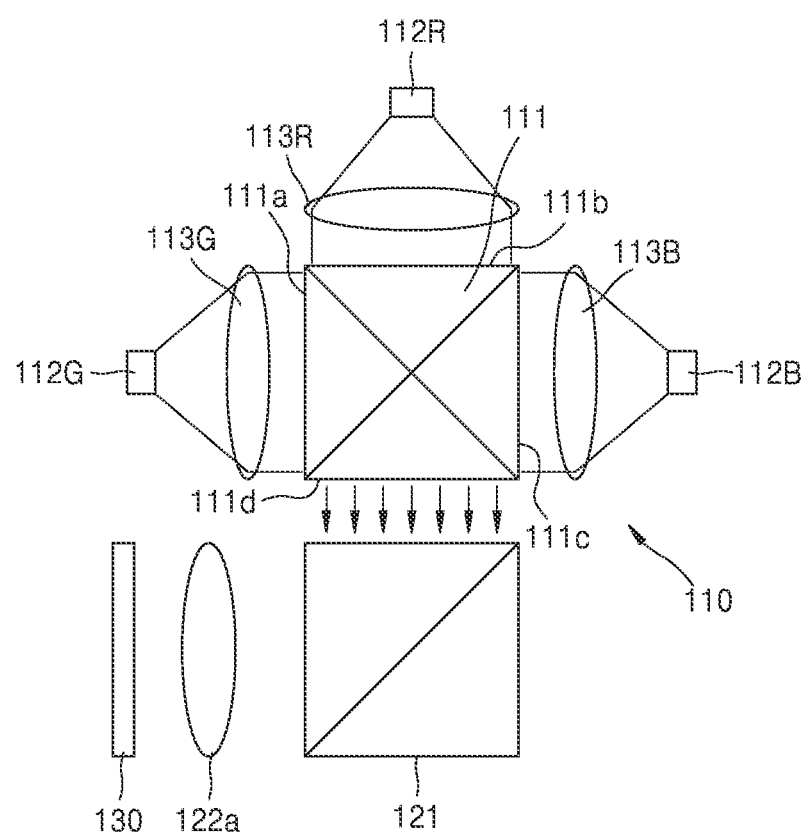
FIG. 13 is a cross-sectional view of an example arrangement of some components of a multi-image display apparatus according to an example embodiment.

FIG. 13 is a cross-sectional view illustrating an arrangement of some components of a multi-image display apparatus according to an example embodiment. Referring to FIG. 13, the multi-image display apparatus may include a light source 110 that provides parallel light to the first beam splitter 121. For example, the light source 110 may include a beam combiner 111 facing the first beam splitter 121, a first light-emitting device 112G disposed to face the first surface 111a of the beam combiner 111, a first collimating lens 113G between the beam combiner 111 and the first light-emitting device 112G, a second light-emitting device 112R facing a second surface 112b of the beam combiner 111, a second collimating lens 113R between the beam combiner 111 and the second light-emitting device 112R, a third light-emitting device 112B facing a third surface 111c of the beam combiner 111, and a third collimating lens 113B between the beam combiner 111 and the third light-emitting device 112B. The beam combiner 111 may be disposed so that a fourth surface 111d thereof faces the first beam splitter 121. For example, the beam combiner 111 may be an X-cube.

In a configuration of the light source 110, light emitted from the first light-emitting device 112G is converted to parallel light by the first collimating lens 113G, is reflected by the beam combiner 111, and may enter the first beam splitter 121. Light emitted from the second light-emitting device 112R is converted to parallel light by the second collimating lens 113R and may enter the first beam splitter 121 through the beam combiner 111. Light emitted from the third light-emitting device 112B is converted to parallel light by the third collimating lens 113B, is reflected by the beam combiner 111, and may enter the first beam splitter 121.

According to example embodiments, the spatial light modulator 130 may be a reflective spatial light modulator that modulates incident light while reflecting it. However, embodiments are not limited thereto, and the spatial light modulator 130 may be a transmissive spatial light modulator that modulates incident light while transmitting the incident light. For example, FIG. 14 is a cross-sectional view illustrating an arrangement of some components of a multi-image display apparatus according to an example embodiment, and the multi-image display apparatus is depicted in the same direction as the direction of the multi-image display apparatus of FIG. 2.

Figure 14:
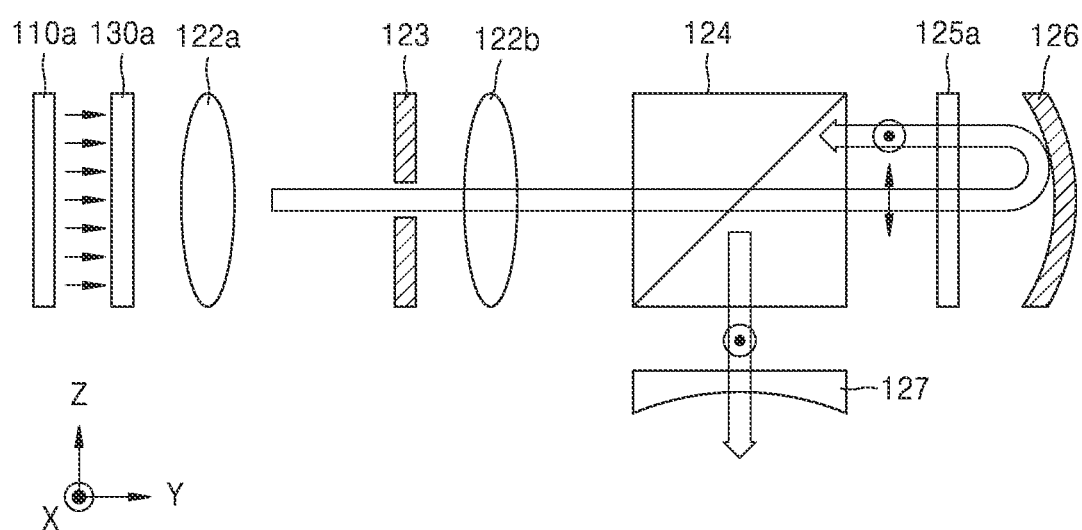
FIG. 14 is a cross-sectional view illustrating an arrangement of some components of a multi-image display apparatus according to an example embodiment.

Referring to FIG. 14, the multiple image display apparatus may include a surface light source 110a that emits parallel light and a transmissive spatial light modulator 130a instead of the light source 110, the first beam splitter 121, and the spatial light modulator 130 of reflective type depicted in FIG. 2. Accordingly, the surface light source 110a, the transmissive spatial light modulator 130a, and the first lens 122a may be sequentially disposed in a traveling direction of light. The configuration after the first lens 122a may be the same as the configuration described with reference to FIG. 2 and FIG. 3. In this case, the second beam splitter 124 may be configured to transmit light incident from the transmissive spatial light modulator 130a. The optical system may include a first optical path from the surface light source 110a to the first mirror 126, a second optical path in a vertical direction between the second beam splitter 124 and the third beam splitter 128 (refer to FIG. 3), and a third light path from the second mirror 129 (refer to FIG. 3) and the viewer.

Meanwhile, the multi-image display apparatus may include a point light source and a collimating lens instead of the surface light source 110a. The transmissive spatial light modulator 130a may include, for example, a semiconductor modulator based on a compound semiconductor, such as gallium arsenide (GaAs), or a liquid crystal device (LCD). When the transmissive spatial light modulator 130a is used, the first beam splitter 121 may be omitted, and thus, the configuration of the optical system may be more simplified.

Figure 15:
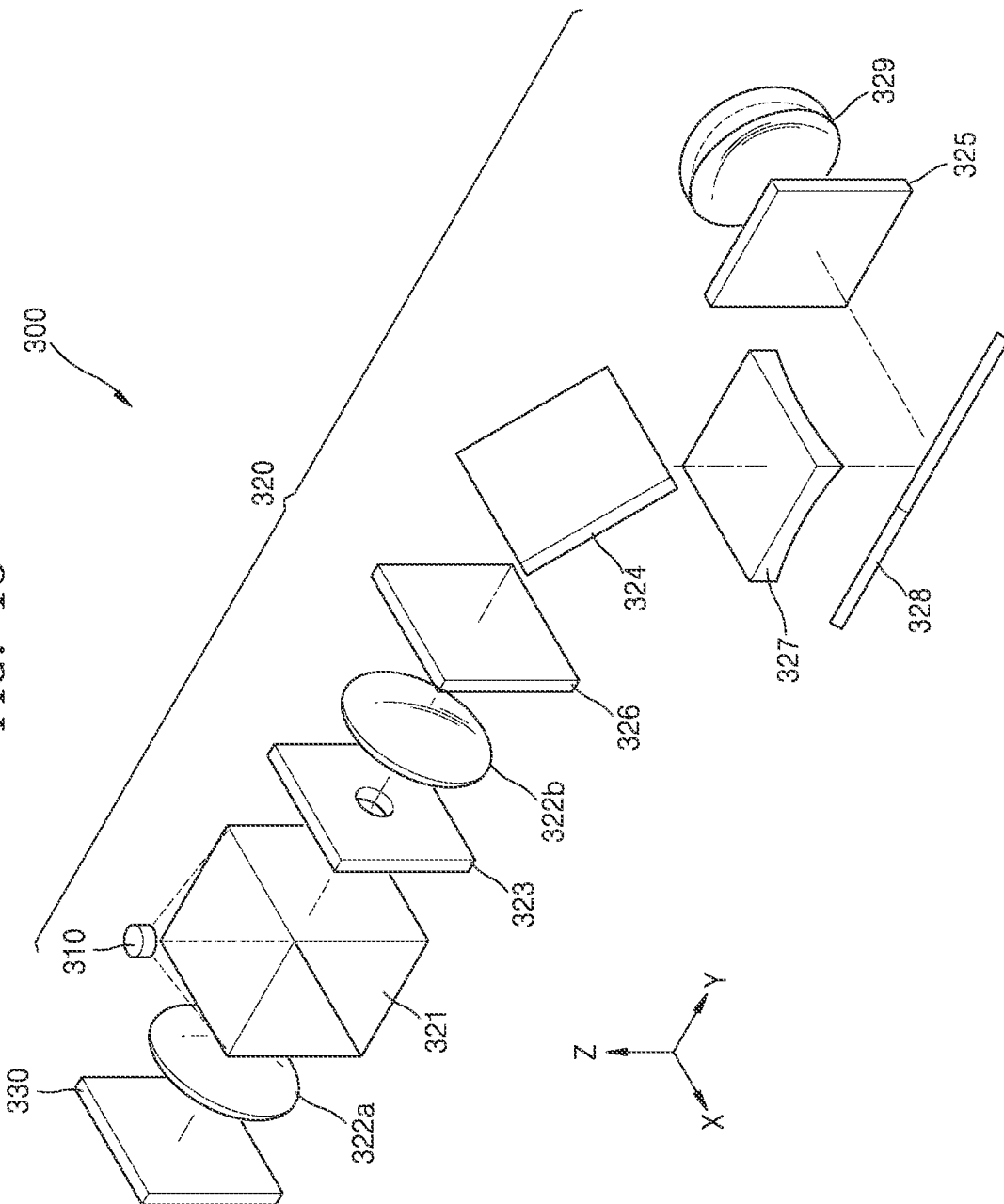
FIG. 15 is a schematic perspective view illustrating a configuration of a multi-image display apparatus according to an example embodiment.

FIG. 15 is a perspective view illustrating a configuration of a multi-image display apparatus 300 according to an example embodiment. Referring to FIG. 15, the multi-image display apparatus 300 may include a light source 310, an optical system 320, and a spatial light modulator 330. The light source 310 may be the same as the light source 110 of the multi-image display apparatus 100 depicted in FIG. 1, and the spatial light modulator 330 may be the same as the spatial light modulator 130 of the multi-image display apparatus 100 depicted in FIG. 1.

The optical system 320 may include a first lens 322a, a first beam splitter 321, a spatial filter 323, a second lens 322b, a half-wave plate 326, and a first mirror 324 that are sequentially disposed in the +y direction. Also, the optical system 320 may further include a third lens 327 and a second beam splitter 328 that are sequentially disposed in the −z direction below the first mirror 324. The optical system 320 may further include a quarter-wave plate 325 and a second mirror 329 that are disposed in the −x direction facing the second beam splitter 328. Accordingly, when the optical system 320 is compared with the optical system 120 of the multi-image display apparatus 100 depicted in FIG. 1, the optical system 320 of the multi-image display apparatus 300 includes the first mirror 324 instead of the second beam splitter 124 and does not include the first quarter-wave plate 125a and the first mirror 126 but further includes the half-wave plate 326.

Figure 16:
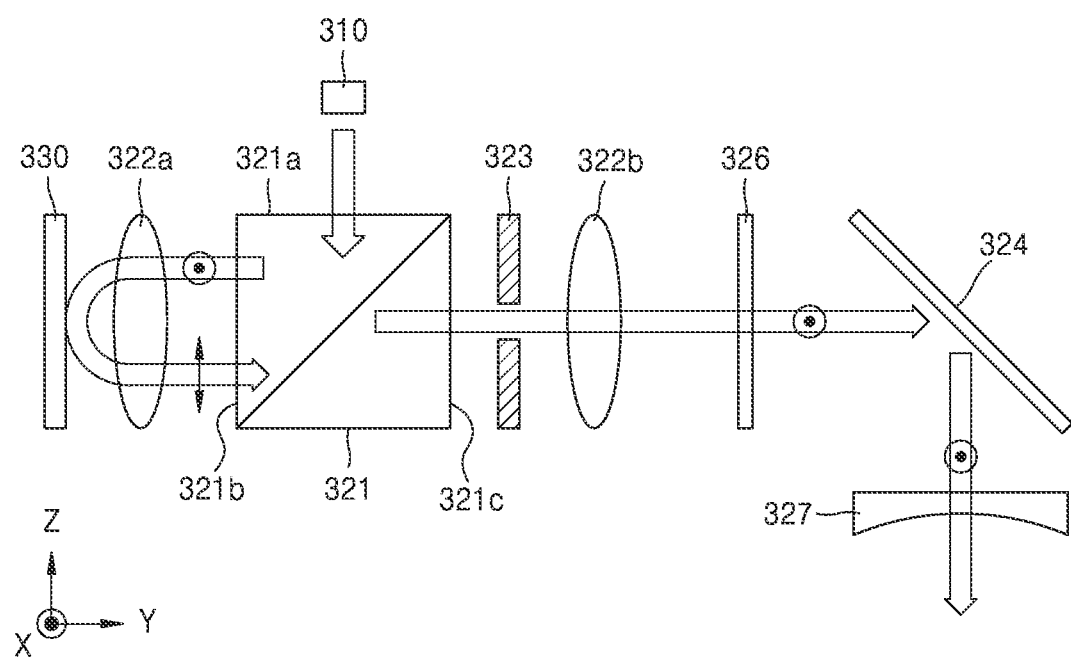
FIG. 16 is a cross-sectional view taken along a direction illustrating an arrangement of some components of the multi-image display apparatus of FIG. 15.

FIG. 16 is a cross-sectional view taken along a direction illustrating an arrangement of some of the components of the multi-image display apparatus 300 of FIG. 15. For example, FIG. 16 is a cross-sectional view of the optical system 320 cut in a plane including a z-axis and a y-axis to show the components from the spatial light modulator 330 to the third lens 327 disposed in the +y direction.

Referring to FIG. 16, the light source 310 is disposed facing a first surface 321a of the first beam splitter 321. Accordingly, light emitted from the light source 310 is incident on the first surface 321a of the first beam splitter 321. The first beam splitter 321 is a polarization beam splitter that reflects light having a first linearly polarized light component and transmits light having a second linearly polarized light component orthogonal to the first linearly polarized light component. Light having the first linearly polarized light component of the light emitted from the light source 310 is reflected by the first beam splitter 321 and light having the second linearly polarized light component may be transmitted through the first beam splitter 321.

The spatial light modulator 330 is disposed facing a second surface 321b of the first beam splitter 321. The light having the first linearly polarized light component reflected from the first beam splitter 321 is emitted through the second surface 321b of the first beam splitter 321 and enters the spatial light modulator 330. The first lens 322a converts light coming from the first beam splitter 321 into parallel light having a constant beam diameter. The spatial light modulator 330 modulates and reflects incident light, and the modulated light interferes with each other to form a holographic image. Then, when the light is modulated by the spatial light modulator 330, the light is rotated 90 degrees and the light has the second linearly polarized light component. The light including the holographic image is incident again on the second surface 321b of the first beam splitter 321. At this time, the light is focused through the first lens 322a. The light having the second linearly polarized light component is transmitted through the first beam splitter 321 and may be emitted through the third surface 321c of the first beam splitter 321 facing the second surface 321b.

The light transmitted through the first beam splitter 321 enters the first mirror 324 after passing through the spatial filter 323, the second lens 322b, and the half-wave plate 326. In FIG. 16, it is depicted that the spatial filter 123, the second lens 122b, and the half-wave plate 326 are sequentially disposed in a traveling direction of the light, but embodiments are not limited thereto. For example, the spatial filter 123 and the second lens 122b may be disposed on an optical path between the first beam splitter 321 and the first mirror 324 regardless of the order. Also, the half-wave plate 326 may be disposed on any location on the optical path between the first beam splitter 321 and the second beam splitter 328.

The light having the second linearly polarized light component may have a first linearly polarized light component while a phase thereof is changed 180 degrees by the half-wave plate 326. The light having the first linearly polarized light component is reflected by the first mirror 324 and is incident on the third lens 327 located below the first mirror 324. Accordingly, the traveling direction of light is bent by about 90 degrees by the first mirror 324. For this purpose, the first mirror 324 may be disposed at an angle with respect to the half-wave plate 326 to change the traveling direction of the light by about 90 degrees. Then, the light reflected by the first mirror 324 travels in the −z direction. Also, in FIG. 16, the first mirror 324 is a simple plane mirror, but embodiments are not limited thereto. For example, the first mirror 324 may be a concave mirror having a concave reflective surface to enlarge an image.

The light reflected by the first mirror 324 passes through the third lens 327 and enters the second beam splitter 328. The light incident on the second beam splitter 328 has a first linearly polarized light component. The configuration and operation of the second beam splitter 328, the quarter-wave plate 325, and the second mirror 329 may be the same as those of the third beam splitter 128, the second quarter-wave plate 125b, and the second mirror 129 described with reference to FIG. 3. For example, the second beam splitter 328 may be a polarization beam splitter that reflects light having a first linearly polarized light component and transmits light having a second linearly polarized light component orthogonal to the first linearly polarized light component. The configuration and operation of the second beam splitter 328, the quarter-wave plate 325, and the second mirror 329 may be the same as those of the third beam splitter 128, the second quarter-wave plate 125b, and the second mirror 129 described with reference to FIG. 10. In this case, the second beam splitter 328 may be configured to transmit light of the first linearly polarized light component and reflect light of the second linear polarized light component. Accordingly, the second beam splitter 328 transmits the light reflected from the first mirror 324 and reflects the light reflected from the second mirror 329.

Figure 17:
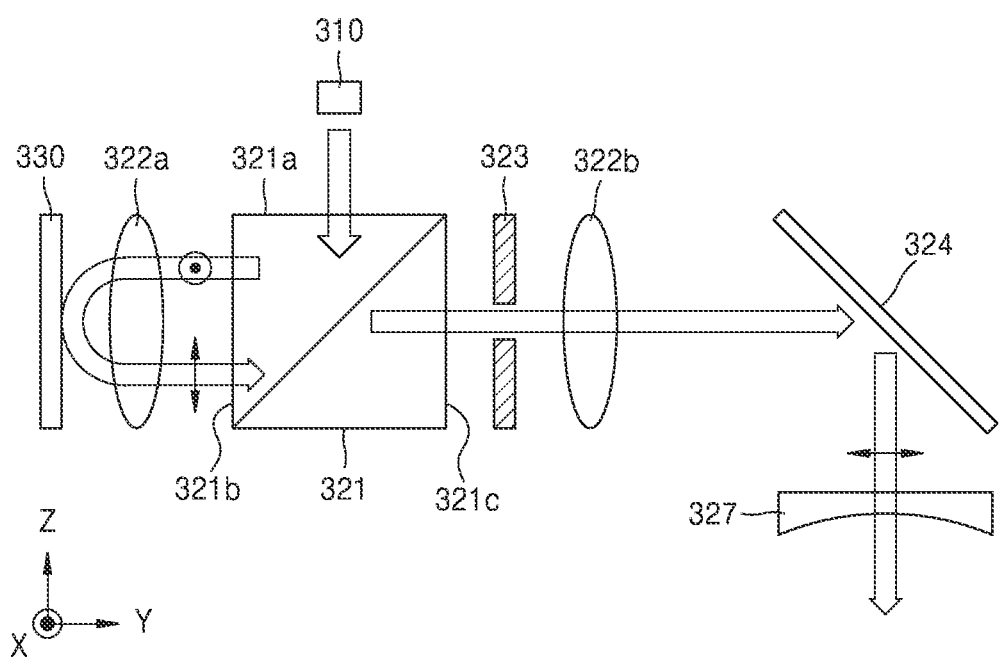
FIG. 17 is a cross-sectional view taken along a direction illustrating an arrangement of some components of the multi-image display apparatus of FIG. 15.

FIG. 17 is a cross-sectional view taken along a direction illustrating an arrangement of some of the components of the multi-image display apparatus 300 shown in FIG. 15. When compared with the arrangement of FIG. 16, the half wave-plate 326 is omitted from the arrangement of FIG. 17. In this case, the light reflected by the first mirror 324 and enters the second beam splitter 328 has a second linearly polarized light component.

Figure 18:
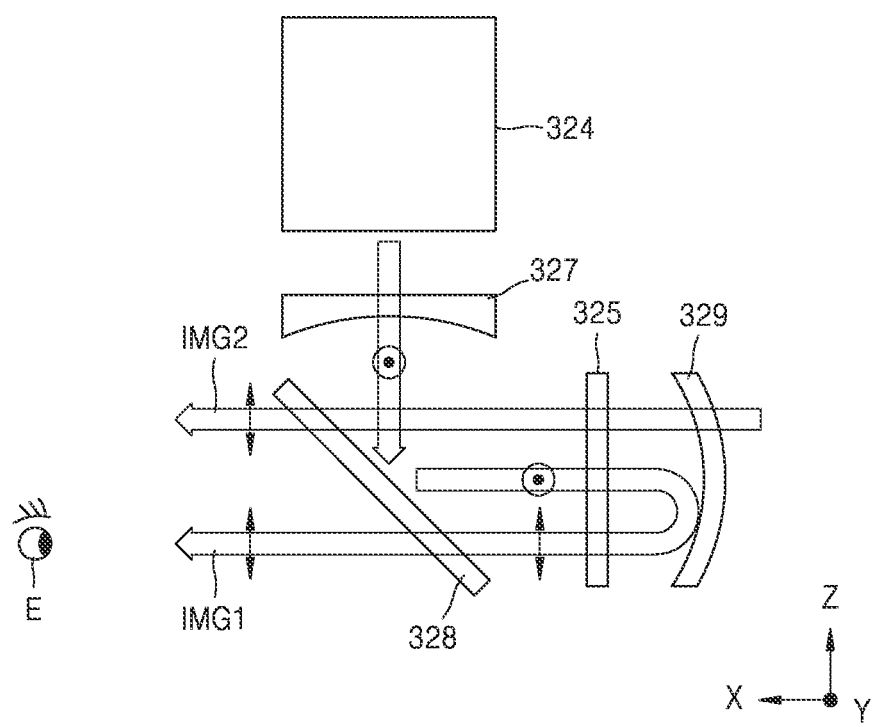
FIG. 18 is a cross-sectional view taken along another direction illustrating an arrangement of some other components of the multi-image display apparatus of FIG. 15.

FIG. 18 is a cross-sectional view taken along another direction illustrating an arrangement of some other components of the multi-image display apparatus of FIG. 15. For example, FIG. 18 is a cross-sectional view of the optical system 320 taken along a plane including the z-axis and the x-axis in FIG. 15 so as to specifically show the path of light from the first mirror 324 to the viewer's eye. Since the sectional view of FIG. 18 is rotated by 90 degrees with respect to the sectional view of FIG. 17, in FIG. 18, the linearly polarized light component is displayed in reverse to FIG. 17. For example, although the first linearly polarized light component is represented by '⊙' and the second linearly polarized light component is represented by '↕' and '⇔' in FIG. 17, but in FIG. 18, the first linearly polarized light component is represented by ↕ and the second linearly polarized light component is represented by '⊙'.

Referring to FIG. 18, the second beam splitter 328 may be a polarization beam splitter that reflects light having a second linearly polarized light component and transmits light having a first linearly polarized light component. Accordingly, the light of the second linearly polarized light component reflected by the first mirror 324 and incident on the second beam splitter 328 is reflected by the second beam splitter 328. At this time, a light path is bent by about 90 degrees, and the light travels in the −x direction. The light reflected by the second beam splitter 328 passes through the quarter-wave plate 325 and enters the second mirror 329. The light incident on the second mirror 329 has the second circularly polarized light component by the quarter-wave plate 325.

The light having the second circularly polarized light component is reflected by the second mirror 329 in an opposite direction, that is, in a direction of 180 degrees with respect to an incidence direction. Accordingly, the light reflected by the second mirror 329 travels in the +x direction. At this time, the polarized light component of the light reflected by the second mirror 329 is converted into a first circularly polarized light component. Then, the light again has a first linearly polarized light component while passing through the quarter-wave plate 325. Then, the light having the first linearly polarized light component is transmitted through the second beam splitter 328 and enters the eye E of the viewer. The second mirror 329 may be a concave mirror having a concave reflective surface to enlarge the image or may be a simple plane mirror.

The second beam splitter 328 may be a polarization beam splitter that reflects light having a first linearly polarized light component and transmits light having a second linearly polarized light component. In this case, the configuration and operation of the second beam splitter 328, the quarter-wave plate 325, and the second mirror 329 are the same as those of the third beam splitter 128, the second quarter-wave plate 125*b*, and the second mirror 129, and only a polarization direction may be reversed.

Figure 19:
FIGS. 19, 20, and 21 show various electronic devices employing a multi-image display apparatus according to example embodiments.
Figure 20:
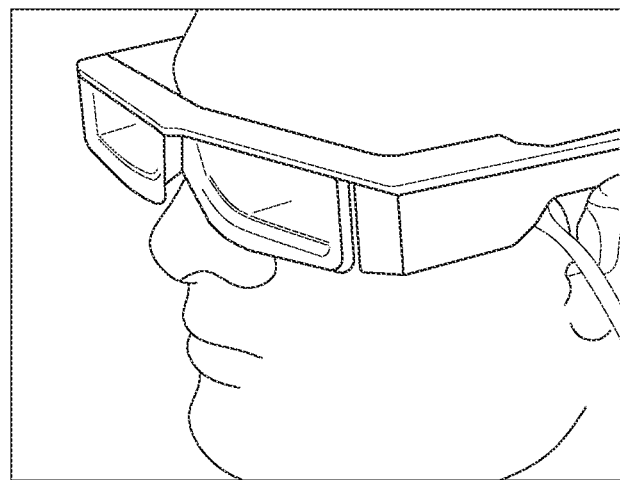
Figure 21:
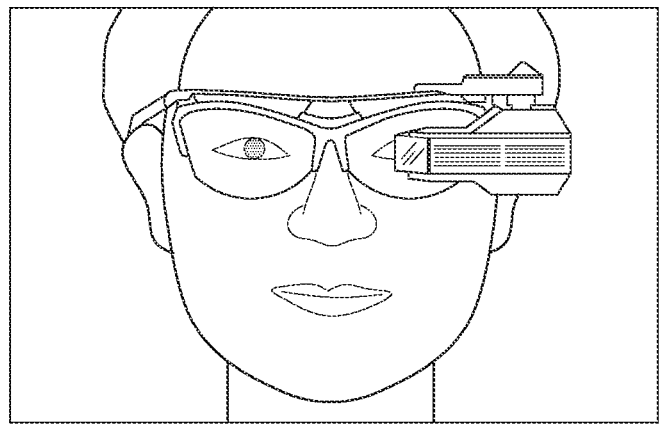

FIGS. 19 through 21 illustrate various electronic devices employing the multi-image display apparatus 100 according to the example embodiments described above. As depicted in FIGS. 19 to 21, the multi-image display apparatus 100 may constitute a wearable device. The multi-image display apparatus 100 may be applied to a wearable device. For example, the multi-image display apparatus 100 may be applied to a head mounted display (HMD). Also, the multi-image display apparatus 100 may be applied to a glasses-type display, a goggle-type display, etc. The wearable electronic devices shown in FIGS. 19 through 21 may be operated in interconnection with a smart phone. The multi-image display apparatus 100 may be a VR display device, an AR display device, or a MR display device of a head-mounted type or a glasses or goggle type capable of providing a virtual reality or providing a virtual image together with an external real image.

Also, the multi-image display apparatus 100 may be included in a smart phone, and the smart phone itself may be used as a multi-image display apparatus. In other words, the multi-image display apparatus 100 may be applied to a small electronic device such as a mobile electronic device other than the wearable device as shown in FIGS. 19 through 21. However, embodiments are not limited thereto, and the application field of the multi-image display apparatus 100 may be variously changed. For example, the multi-image display apparatus 100 may be applied not only to realize a VR, an AR, or a MR, but also to other fields. For example, the multi-image display apparatus 100 may be applied to a small television or a small monitor that may be worn by a user.

While one or more example embodiments have been described with reference to the figures, it will be understood by those of ordinary skill in the art that various changes in form and details may be made therein without departing from the spirit and scope as defined by the following claims.

What is claimed is:

1. A multi-image display apparatus comprising:
   a light source configured to emit light;
   a spatial light modulator configured to provide a first image by modulating the light emitted from the light source; and
   an optical system configured to transmit the first image provided by the spatial light modulator to a viewer,
   wherein the optical system is configured such that a first travelling path of the first image provided by the spatial light modulator comprises a first optical path in a first direction, a second optical path in a second direction orthogonal to the first direction, and a third optical path in a third direction orthogonal to the first direction and the second direction,
   wherein the optical system is configured such that the first image and a second image provided from a second travelling path different from the first travelling path are provided to the viewer along the third optical path,
   wherein the spatial light modulator comprises a reflective spatial light modulator configured to reflect and modulate the light emitted from the light source,
   wherein the optical system comprises:
      a first beam splitter configured to reflect the light emitted from the light source towards the spatial light modulator and to transmit the light reflected from the spatial light modulator;
      a first mirror configured to reflect the light transmitted from the first beam splitter;
      a second beam splitter provided in the second direction from the first mirror; and
      a second mirror configured to reflect light reflected from the second beam splitter,
   wherein the first mirror is further configured to reflect the light transmitted from the first beam splitter toward the second beam splitter in the second direction.

2. The multi-image display apparatus of claim 1, wherein the second beam splitter is configured to reflect the light from the first mirror and to transmit the light reflected from the second mirror.

3. The multi-image display apparatus of claim 2, wherein each of the first beam splitter and the second beam splitter comprises a polarization beam splitter configured to reflect light having a first linearly polarized light component and to transmit light having a second linearly polarized light component that is orthogonal to the first linearly polarized light component, and
   wherein the optical system further comprises a half-wave plate provided between the first beam splitter and the second beam splitter, and a quarter-wave plate provided between the second beam splitter and the second mirror.

4. The multi-image display apparatus of claim 2, wherein the first beam splitter comprises a polarization beam splitter configured to reflect light having a first linearly polarized light component and to transmit light having a second linearly polarized light component that is orthogonal to the first linearly polarized light component,
   wherein the second beam splitter comprises a polarization beam splitter configured to transmit light having the first linearly polarized light component and to reflect light having the second linearly polarized light component, and
   wherein the optical system further comprises a quarter-wave plate provided between the second beam splitter and the second mirror.

* * * * *